(12) United States Patent
Lee et al.

(10) Patent No.: US 9,704,618 B2
(45) Date of Patent: Jul. 11, 2017

(54) NUCLEAR POWER PLANT CABLE AND MONITORING SYSTEM THEREFOR

(71) Applicant: LS Cable & System Ltd., Anyang-si, Gyeonggi-do (KR)

(72) Inventors: Jae-Bok Lee, Seongnam-si (KR); Chan-Yong Park, Gunpo-si (KR); Hyun-Woong Kim, Seoul (KR)

(73) Assignee: LS CABLE & SYSTEM LTD., Anyang-si, Gyeonggi-do (KR)

( * ) Notice: Subject to any disclaimer, the term of this patent is extended or adjusted under 35 U.S.C. 154(b) by 967 days.

(21) Appl. No.: 14/157,592

(22) Filed: Jan. 17, 2014

(65) Prior Publication Data

US 2014/0211901 A1  Jul. 31, 2014

(30) Foreign Application Priority Data

Jan. 21, 2013  (KR) .................. 10-2013-0006329

(51) Int. Cl.
| | | |
|---|---|---|
| *G02B 6/44* | (2006.01) | |
| *H01B 7/32* | (2006.01) | |
| *G02B 6/00* | (2006.01) | |
| *G21D 3/04* | (2006.01) | |

(52) U.S. Cl.
CPC .............. *H01B 7/32* (2013.01); *G02B 6/4415* (2013.01); *G21D 3/04* (2013.01)

(58) Field of Classification Search
CPC .................................... H01B 7/32; G21D 3/04
See application file for complete search history.

(56) References Cited

U.S. PATENT DOCUMENTS

| | | | | | |
|---|---|---|---|---|---|
| 4,346,478 | A | * | 8/1982 | Sichling | H04B 14/026 250/227.21 |
| 4,838,690 | A | * | 6/1989 | Buckland | G01M 11/39 356/73.1 |
| 4,854,668 | A | * | 8/1989 | Mayr | G02B 6/4486 385/128 |
| 6,144,032 | A | * | 11/2000 | Gazdzinski | G01N 23/222 250/269.6 |
| 6,300,634 | B1 | * | 10/2001 | Gazdzinski | G01N 23/222 250/269.6 |
| 6,317,540 | B1 | * | 11/2001 | Foulger | G02B 6/4469 324/555 |
| 6,388,194 | B1 | * | 5/2002 | Ryeczek | G01K 11/12 116/207 |
| 7,068,893 | B2 | * | 6/2006 | Oh | H01B 7/324 385/101 |
| 8,170,382 | B2 | * | 5/2012 | Galarneau | G01K 11/00 385/12 |
| 8,953,915 | B2 | * | 2/2015 | Sarchi | G01K 11/32 385/101 |
| 9,117,569 | B2 | * | 8/2015 | Cho | H01B 7/328 |
| 9,322,969 | B2 | * | 4/2016 | Burov | G01N 21/255 |
| 9,400,221 | B2 | * | 7/2016 | Sarchi | G01M 5/0025 |

(Continued)

*Primary Examiner* — Rhonda Peace
(74) *Attorney, Agent, or Firm* — Paratus Law Group, PLLC

(57) ABSTRACT

The present invention relates to a nuclear power plant cable including: conductors; at least one or more insulation layers adapted to correspondingly surround the conductors; a sheath adapted to surround the insulation layers; and monitoring means adapted to monitor the states of the insulation layers or the state of the sheath in real time.

12 Claims, 11 Drawing Sheets

(56) References Cited

U.S. PATENT DOCUMENTS

| | | | | |
|---|---|---|---|---|
| 2003/0094281 A1* | 5/2003 | Tubel | ............... | E21B 47/00 166/250.03 |
| 2005/0123254 A1* | 6/2005 | Oh | ............... | H01B 7/324 385/101 |
| 2010/0277329 A1* | 11/2010 | Worzyk | ............... | G01M 11/086 340/679 |
| 2011/0127065 A1* | 6/2011 | Park | ............... | H01B 7/292 174/110 R |
| 2012/0099825 A1* | 4/2012 | Messer | ............... | G02B 6/4432 385/113 |
| 2013/0084415 A1* | 4/2013 | McGrady | ............... | C08K 5/0066 428/36.91 |
| 2013/0180755 A1* | 7/2013 | Park | ............... | H01B 7/17 174/120 SR |
| 2014/0211901 A1* | 7/2014 | Lee | ............... | H01B 7/32 376/248 |
| 2014/0254994 A1* | 9/2014 | Cho | ............... | H01B 7/328 385/101 |

\* cited by examiner

Fig. 4
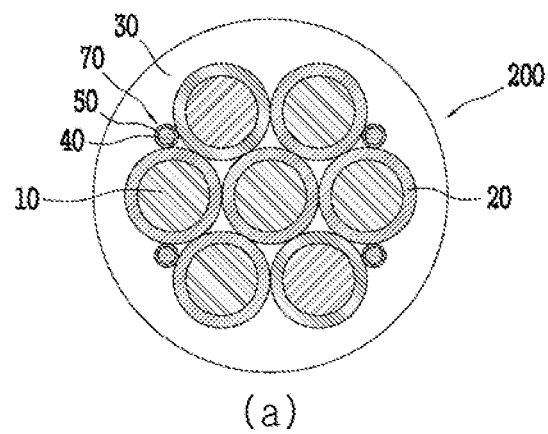
(a)
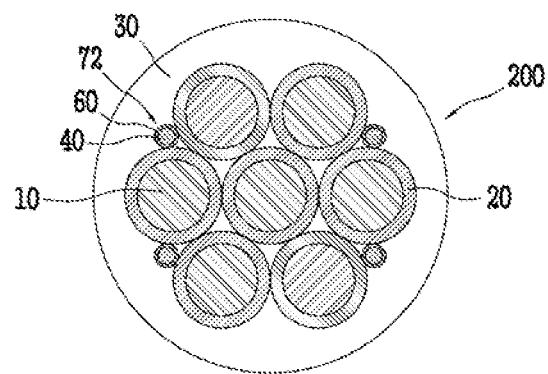
(b)
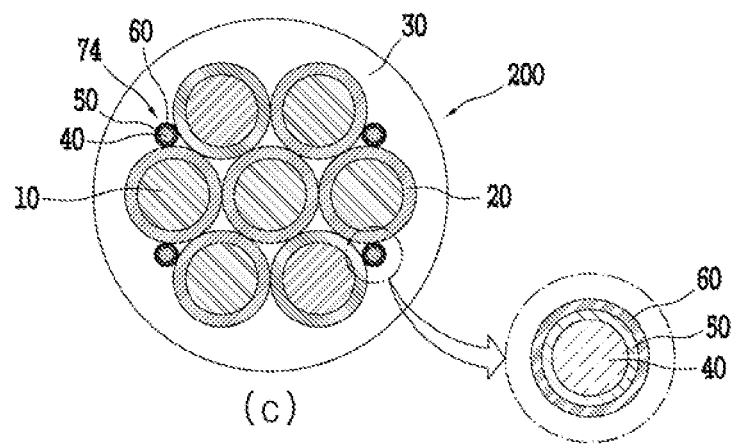
(c)

NUCLEAR POWER PLANT CABLE AND MONITORING SYSTEM THEREFOR

CROSS REFERENCE TO RELATED APPLICATION

This application claims the benefit of the Korean Patent Application No. 10-2013-0006329, filed on Jan. 21, 2013, which is hereby incorporated by reference as if fully set forth herein.

BACKGROUND OF THE INVENTION

Field of the Invention

The present invention relates to a nuclear power plant cable and a monitoring system therefor, and more particularly, to a nuclear power plant cable whose damage or life span being monitored in real time and a nuclear power plant cable monitoring system that is capable of monitoring the state of a nuclear power plant cable in real time, without having any physical destruction or chemical changes.

Background of the Related Art

Recently, with the drastic development of nuclear power generation technology like fourth generation nuclear power plants, focusing on the design technology of the nuclear power plant, the extension of the life span of operating equipment, and the cables needed for the operation of the equipment is appearing. After the Fukushima nuclear power plant accident, especially, high focusing on the stability of the equipment installed in the nuclear power plant appears, and accordingly, focusing on the stability of all kinds of cables installed in the nuclear power plant also appears. The nuclear power plant cables used in the nuclear power plant should provide radiation resistance, heat resistance, chemical resistance, and reliability for the use of a long period of time.

The fourth generation nuclear power plant is provided to strength the stability and economic effects of the nuclear power plant, which means the nuclear power plant available for about 60 or more. Like this, in case where the nuclear power plant is used for a long period of time, the cables for transmitting power and electrical signals to a variety of equipment of the nuclear power plant become ones of the most important equipment. Unlike other equipment of the nuclear power plant, the cables are installed basically as an infrastructure, and after the installation, it is impossible for them to be separated, disassembled and moved, without having the stop of the activation of the nuclear power plant. So as to ensure the stability of the cables installed in the nuclear power plant, without any stop, accordingly, the states of the cables should be monitored continuously, and further, the life spans of the cables should be also measured.

There are various methods for monitoring the nuclear power plant cables installed in the nuclear power plant. For example, the first method makes use of chemical properties of the cables. That is, the correlation relation between the variation of the chemical properties of the insulating materials of the cables and the thermal aging of the cables is checked. In more detail, the first method makes use of infrared spectrophotometer, oxidation induction time, thermo gravimetric analysis TGA and the like. The second method makes use of mechanical properties of the cables. That is, the variations of the compression rate, density, and elasticity rate of the cables are measured. In the second method, especially, an EAB (Elongation At Break) using the elongation rate is typically used for estimating the life spans of the cables. However, the first and second methods making use of the chemical and mechanical properties of the cables are limited in application in accordance with the materials of the cables, and further, they cause the destruction of the cables.

On the other hand, there is an electrical method for applying power to the insulating materials of the cables to sense their variation degrees through the thermal aging. That is, this method makes use of insulation resistance, voltage resistance, dielectric loss, dielectric tangent, partial discharge and the like. By the way, the electrical method is applicable to all kinds of materials, but it is hard to quantitatively display the correlation relation with the thermal aging.

So as to expect the life spans of the nuclear power plant cables in the conventional practices, accordingly, the existing cables should be removed and disassembled to check whether the insulation layers of the cables are damaged or not. However, it is hard to conduct the removal of the cables over the whole region of the nuclear power plant. Thus, the test of the cables is carried out only on a given region of the nuclear power plant, but according to the characteristics of the nuclear reactor having radiation emitted therefrom, the cables do not have the same aging degrees over the whole region of the nuclear power plant. So as to apply the removal of the cables and the measurement of the life spans of the cables, further, the activation of the nuclear power plant should stop or restart, which requires astronomical costs, and demander load caused by the stop of the activation of the nuclear power plant is added undesirably to the load of the operation of the nuclear power plant. The aged cables or damaged cables in the existing cables installed in the nuclear power plant should be exchanged with new ones, but it is very hard to remove the cables because of the structures of the ducts of the cables of the nuclear power plant. Furthermore, the removal of the cables needs very high costs.

SUMMARY OF THE INVENTION

Accordingly, the present invention has been made in view of the above-mentioned problems occurring in the prior art, and it is an object of the present invention to provide a nuclear power plant cable whose damage or life span being monitored in real time.

It is another object of the present invention to provide a nuclear power plant cable monitoring system that is capable of monitoring the state of a nuclear power plant cable, without having the disassembling, removal or separation.

To accomplish the above objects, a nuclear power plant cable comprises conductors, at least one or more insulation layers to surround the conductors, a sheath to surround the insulation layers and monitoring means to monitor the states of the insulation layers or the state of the sheath in real time.

The monitoring means comprises at least one or more optical cables.

Each optical cable comprises optical fibers and radiation prevention parts to surround the optical fibers.

The radiation prevention parts comprise at least one of a metal thin film and polymer fibers.

The polymer fibers are made of a polymer material including an aromatic group.

The optical cables are located symmetrically inside the nuclear power plant cable.

The optical cables are disposed adjacent to the conductors.

To accomplish the above objects, a nuclear power plant cable monitoring system, comprises a nuclear power plant cable having at least one or more optical cables and a monitoring device to transmit monitoring light upon the optical cables, to receive the reflected monitoring light, and to monitor the nuclear power plant cable.

The monitoring device comprises an OTDR adapted to transmit monitoring light upon the optical cables and to receive the reflected monitoring light and an analyzer adapted to analyze the waveforms of the reflected monitoring light.

Each optical cable comprises optical fibers and radiation prevention parts to surround the optical fibers.

The radiation prevention parts comprise at least one of a metal thin film and polymer fibers.

The polymer fibers are made of a polymer material including an aromatic group.

The optical cables are located symmetrically inside the nuclear power plant cable.

The nuclear power plant cable comprises conductors and at least one or more insulation layers to surround the conductors and the optical cables are disposed adjacent to the conductors.

The analyzer stores standard waveforms of the monitoring light received through the ODTR and compares the standard waveforms with measured waveforms to determine whether the nuclear power plant cable is damaged.

The analyzer compares a reflection peak of the standard waveforms with a reflection peak of the measured waveforms to determine whether the nuclear power plant cable is damaged.

The analyzer determines that the nuclear power plant is damaged if at least one of the height and position of the reflection peak of the measured waveforms is different from the reflection peak of the standard waveforms.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 4a to 4c are sectional views showing the internal structures of the nuclear power plant cables according to the second embodiment of the present invention, wherein each internal structure has monitoring means;

DETAILED DESCRIPTION OF THE PREFERRED EMBODIMENT

Hereinafter, an explanation on a nuclear power plant cable and a nuclear power plant cable monitoring system according to the preferred embodiments of the present invention will be in detail given with reference to the attached drawing.

A cable and a monitoring system according to the present invention, which are provided to allow the state of the cable to be monitored in real time, are applied for a nuclear power plant cable used in a nuclear power plant. That is, the nuclear power plant cable used in the nuclear power plant should provide radiation resistance, heat resistance, chemical resistance, and reliability for the use of a long period of time. In case where the nuclear power plant is used for a long period of time, especially, cables for transmitting power and electrical signals to a variety of equipment of the nuclear power plant are ones of the most important equipment. Unlike other equipment of the nuclear power plant, the cables are installed basically as an infrastructure, and after the installation, it is impossible for them to be separated, disassembled and moved, without having the stop of the activation of the nuclear power plant. So as to ensure the stability of the cables of the nuclear power plant, without any stop, accordingly, the states of the cables should be monitored continuously, and the life spans of the cables should be also measured.

So as to expect the life spans of the nuclear power plant cables in the conventional practices, by the way, the existing cables should be removed and disassembled to check whether the insulation layers of the cables are damaged or not. However, it is hard to conduct the removal of the cables over the whole region of the nuclear power plant. Thus, the test of the cables is carried out only on a given region of the nuclear power plant, but according to the characteristics of the nuclear reactor having radiation emitted therefrom, the cables do not have the same aging degrees over the whole region of the nuclear power plant. So as to apply the removal of the cables and the measurement of the cables, further, the activation of the nuclear power plant should stop or restart, which requires astronomical costs, and demander load caused by the stop of the activation of the nuclear power plant is added undesirably to the load of the operation of the nuclear power plant. The aged cables or damaged cables in the existing cables installed in the nuclear power plant should be exchanged with new ones, but it is very hard to remove the cables because of the structures of the ducts of the cables of the nuclear power plant. Furthermore, the removal of the cables needs very high costs. So as to remove the above-mentioned problems, accordingly, a nuclear power plant cable and a nuclear power plant cable monitoring system according to the present invention will be described below.

Figure 1:
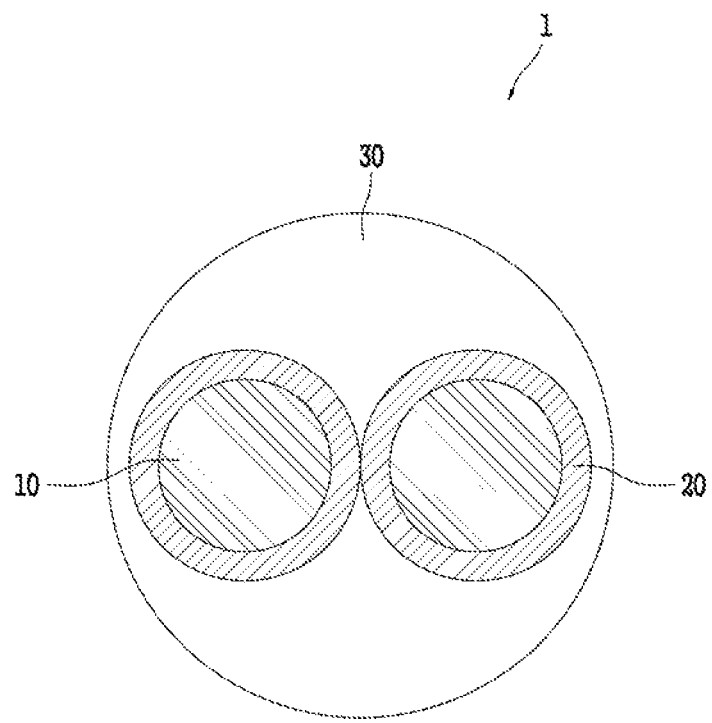
FIG. 1 is a sectional view showing the internal structure of a nuclear power plant cable according to a first embodiment of the present invention.
Figure 2:
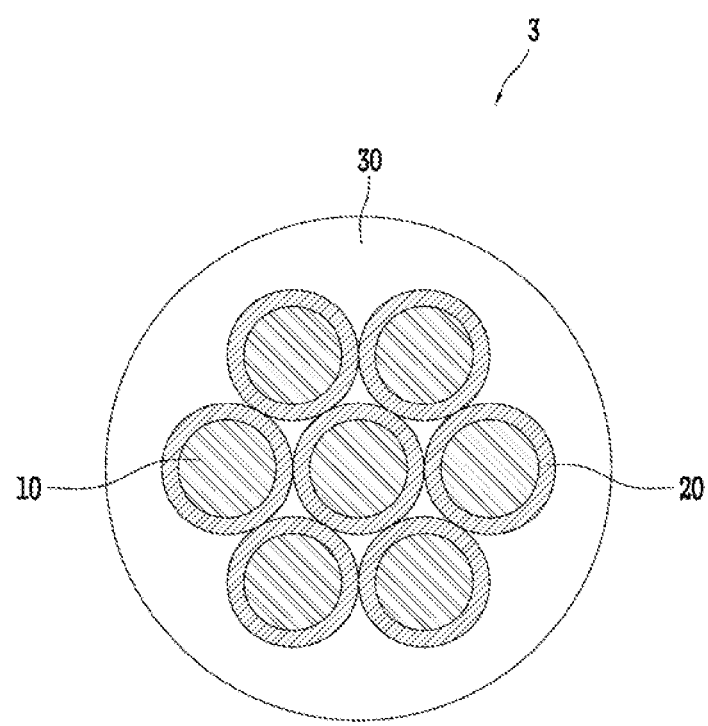
FIG. 2 is a sectional view showing the internal structure of a nuclear power plant cable according to a second embodiment of the present invention.

FIGS. 1 and 2 show the internal structures of nuclear power plant cables according to first and second embodiments of the present invention. For example, the nuclear power plant cables as will be discussed hereinafter are control cables capable of transmitting control signals controlling a variety of equipment in a nuclear power plant.

As shown in FIG. 1, a nuclear power plant cable 1 includes conductors 10 disposed at the interior thereof, insulation layers 20 adapted to correspondingly surround the conductors 10, and a sheath 30 adapted to surround the insulation layers 20. In this case, the sheath 30 is made of a radiation resistance material so as to reduce the damage and exposure of the conductors 10 caused by the radiation generated from the nuclear power plant. On the other hand, the nuclear power plant cable 1 is a two-core control cable having two conductors 10.

On the other hand, the cable in FIG. 2 has a similar structure to that in FIG. 1, except that the number of conductors 10 is different from that of the cable of FIG. 1. That is, a nuclear power plant cable 3 as shown in FIG. 2 is a seven-core control cable having seven conductors 10. The cables as shown in FIGS. 1 and 2 are just examples, but the number of conductors and the configurations formed to surround the conductors disposed inside the cables may be appropriately varied.

Hereinafter, monitoring means and system for recognizing the states of the nuclear power plant cables having the above-mentioned structures in real time will be explained.

Figure 3:
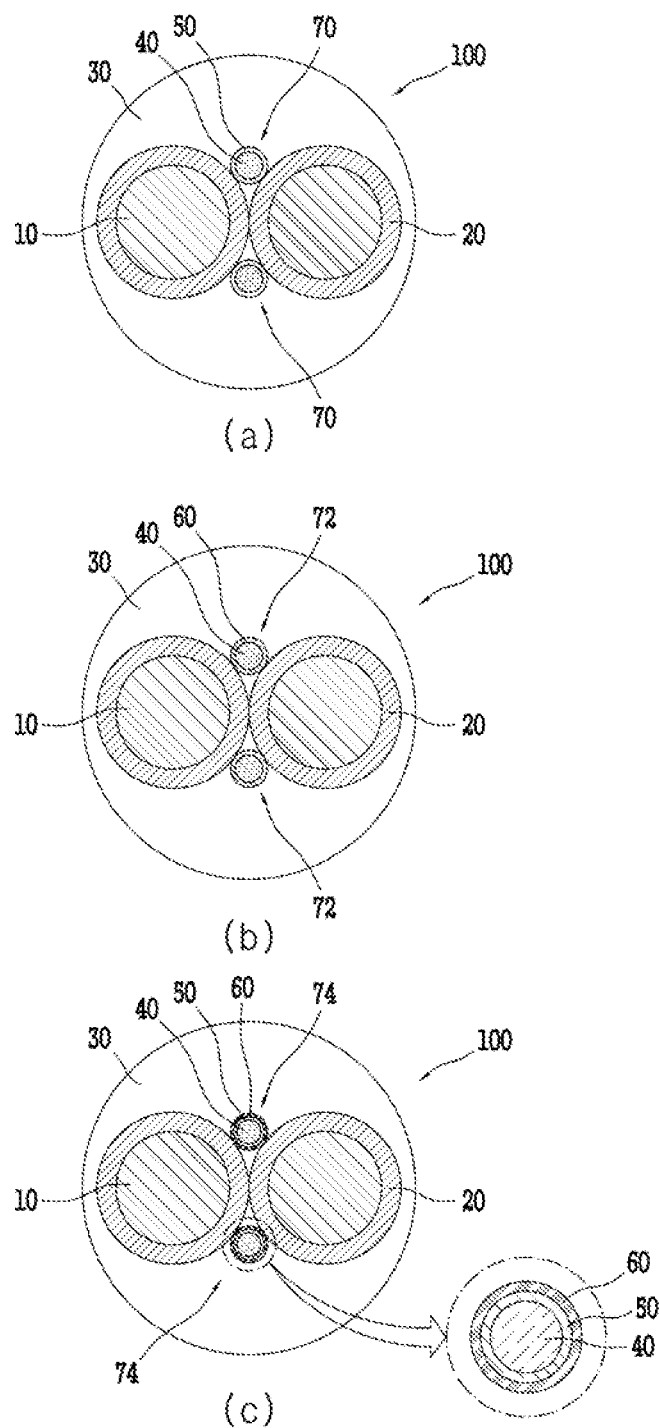
FIGS. 3a to 3c are sectional views showing the internal structures of the nuclear power plant cable according to the first embodiment of the present invention, wherein each internal structure has monitoring means.

FIGS. 3*a* to 3*c* are sectional views showing the two-core nuclear power plant cables according to the first embodiment of the present invention, wherein each cable has monitoring means.

In FIGS. 3*a* to 3*c*, the conductors 10, the insulation layers 20 and the sheath 30 of a nuclear power plant cable 100 have been explained above, and accordingly, they will be not explained anymore for the brevity of the description.

The nuclear power plant cable according to the present invention includes monitoring means adapted to monitor the states of the insulation layers 20 or the state of the sheath 30 in real time. The monitoring means does not provide any physical and chemical deformation to the nuclear power plant cable and also does not need any dissembling, separation, and removal of the cable, while performing the real time monitoring of the nuclear power plant cable 100. According to the preferred embodiment of the present invention, an optical cable is used to monitor the state of the nuclear power plant cable in real time.

That is, the monitoring means has at least one or more optical cables disposed inside the nuclear power plant cable 100. Further, the monitoring means has a monitoring device monitoring device 310 (See FIG. 5) adapted to transmit monitoring light upon the optical cables, to receive the reflected monitoring light, and to monitor the nuclear power plant cable. The monitoring device 310 transmits monitoring light upon the optical cables, receives the scattered and/or reflected monitoring light, and monitors whether the nuclear power plant cable is damaged or not.

In this case, the existence of the optical cables enables the aging degree, that is, life span, of the nuclear power plant cable 100 to be recognized. If the insulator is damaged by means of the aging of the cable, leaking current occurs, which causes discharging. If the insulator or sheath is damaged through the discharging, further, a temperature is raised locally on the damaged portion, so that the portion on which the temperature is raised is sensed by means of the optical cables. Accordingly, the portion on which the temperature is raised is recognized as the portion on which damage is generated or the life span is shortened and is immediately exchanged or repaired. Hereinafter, the structure of the nuclear power plant cable 100 having the optical cables located therein will be first explained, and next, a monitoring system for monitoring the nuclear power plant cable 100 through the optical cables will be described.

As shown in FIG. 3*a*, the nuclear power plant cable 100 includes at least one or more optical cables 70. The optical cables 70 are located inside the sheath 30 of the nuclear power plant cable 100, and desirably, they are located correspondingly near the conductors 10.

The monitoring means monitors the damage and life spans of the insulation layers 20 and the sheath 30 of the nuclear power plant cable 100 by means of the optical cables 70 and the monitoring device 310, and especially monitors the insulation layers 20 adapted to correspondingly surround the conductors 10. It is important to recognize the damage of the sheath 30 of the nuclear power plant cable 100, but it is much more important to monitor the damage and life spans of the insulation layers 20 correspondingly surrounding the conductors to which control signals are transmitted. Accordingly, in case where the optical cables 70 are located inside the nuclear power plant cable 100, it is desirable that they are disposed adjacent to the insulation layers 20 correspondingly surrounding the conductors 10.

On the other hand, the optical cables 70 are located symmetrically inside the nuclear power plant cable 100. The damage of the nuclear power plant cable 100 is found on both sides of the cable, but it is generally found only on one side of the cable. According to the preferred embodiments of the present invention, accordingly, the optical cables 70 are provided plurally inside the nuclear power plant cable 100, and further, they are located symmetrically inside the nuclear power plant cable 100 to monitor the degrees of damage on a plurality of portions of the cable. The symmetrical location of the optical cables 70 in the cable 100 prevents the center of gravity of the nuclear power plant cable 100 from being inclined to one side, thereby making the manufacturing of the cable 100 easy and further performing the delivery and installation of the cable 100 with ease.

On the other hand, each optical cable 70 includes a plurality of optical fibers 40 and radiation prevention parts 50 and 60 adapted to surround the optical fibers 40. The optical fibers 40 are provided to allow the transmission of the monitoring light to be performed through the monitoring device 310 as will be discussed later, and the radiation prevention parts 50 and 60 are provided to prevent the damage of the optical fibers 40 caused by the radiation generated in the nuclear power plant.

The radiation prevention parts 50 and 60 prevent the optical fibers 40 from being exposed and damaged by means of the radiation generated in the nuclear power plant. According to the preferred embodiments of the present invention, the radiation prevention parts 50 and 60 are made of at least one of a metal thin film and polymer fibers.

In this case, the metal thin film is made of aluminum or copper having radiation shielding effects. The radiation, especially, β-ray generated around a nuclear reactor in the nuclear power plant is much lost in energy and shielded by means of the metal thin film like copper or aluminum. For example, the radiation shielding effect is determined generally with HVL (Half Value Layer). The 'HVL' is defined as the thickness of a shielding member required to reduce the strength of the energy of radiation in half. That is, the smaller the 'HVL' is, the better the shielding effect is, and contrarily, the larger the 'HVL' is, the worse the shielding effect is. The value of the HVL of the copper in the gamma ray energy generated in the nuclear power plant is approximately 21.0 mm, which has more excellent shielding effect than the stainless steel used in the conventional optical cable having the value of HVL of 21.6 mm.

Figure 5:
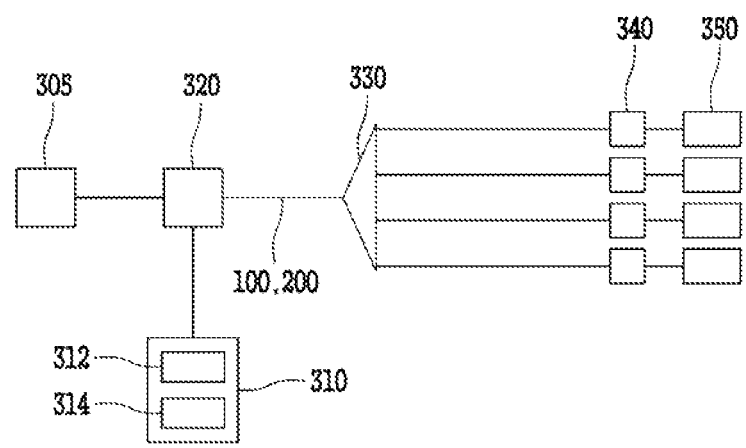
FIG. 5 is a schematic view showing a monitoring system for a nuclear power plant cable according to the present invention.

On the other hand, the monitoring device 310 monitors the nuclear power plant cable by utilizing the monitoring light, especially by means of an Optical Time Domain Reflectometery (which is referred to as 'OTDR') 312 (See FIG. 5). In more detail, the monitoring device 310 checks a point where heat is raised locally on the nuclear power plant cable 100 through the monitoring waveforms of the OTDR 312. An explanation on the operation of the monitoring system using the OTDR will be in detail given later.

The radiation prevention parts, which are adapted to surround the optical fibers 40 of the optical cable 70, are desirably made of materials having excellent radiation shielding effect as well as high external thermal conductivity.

The thermal conductivities of copper and aluminum used as the metal thin film constituting the radiation prevention parts adopted in the present invention are approximately 400 W/m K and 240 W/m K, which are relatively higher than the thermal conductivity of 15 to 20 W/m K of the stainless steel used as the conventional optical cable.

So as to check the difference between the thermal conductivities, the inventor has had the tests for checking the point where the heat is raised locally on the nuclear power plant cable 100 by means of the radiation prevention parts having the metal thin films 50 made of copper and stainless steel. As a result, in case where the temperature is sensed on the cable having the radiation prevention portion made of copper through the monitoring device, it shows the error of about ±1° C. or below when compared with the real temperature of the cable, and contrarily, in case where the temperature is sensed on the cable having the radiation prevention portion made of stainless steel through the monitoring device, it shows the error of about ±5° C. when compared with the real temperature of the cable. As a result, it is found that copper or aluminum having higher thermal conductivity than stainless steel is desirable to recognize the point where heat is raised locally on the nuclear power plant cable 100 through the monitoring device 310 having the OTDR 312 mounted thereon. Desirably, since copper has a low value of HVL in shielding radiation, it shows high radiation shielding effects, and therefore, the copper can be utilized as the metal thin film 50 of the radiation prevention portion in the present invention.

On the other hand, the polymer fibers are made of polymer materials including an aromatic group.

As noted above, as the expected life span of the nuclear power plant becomes increased, the life spans of the nuclear power plant cables are extended. In this case, the radiation resistance quantities required for the cables installed in the nuclear power plant become also increased. The total quantity of radiation cannot be shielded by means of the metal thin film, and accordingly, the polymer material including an aromatic ring in the molecules is coated or taped to allow the radiation energy to be additionally lost. Further, oxidization can be suppressed by means of the film made of the polymer material.

In more detail, the polymer materials including the aromatic group like polyimide do not have any linear structure because of the resonance structure, thereby providing high heat and radiation resistance. Accordingly, if the film made of the polymer materials including the aromatic group is provided to the optical cables, the optical fibers can be protected from the radiation and the aging of the optical fibers can be also kept from high temperature. Moreover, the film having the excellent radiation resistance serves as an oxidation barrier preventing the oxidation of the polymer due to the radiation. Accordingly, the film made of the polymer material including the aromatic group prevents the optical fibers from being exposed to the radiation and being oxidized due to the permeation of the radiation.

Accordingly, the radiation prevention parts adopted in the present invention have at least one of the metal thin film and the polymer fibers.

In FIG. 3a, each optical cable 70 has the metal thin film 50 as the radiation prevention portion, and In FIG. 3b, each optical cable 72 has a polymer layer 60 made of a polymer material including an aromatic group as the radiation prevention portion. In FIG. 3c, further, each optical cable 74 has both of the metal thin film 50 and the polymer layer 60 made of the polymer material including the aromatic group, as the radiation prevention portion. In this case, the metal thin film 50 is adapted to surround the optical fibers 40, and the polymer layer 60 is located on the outer periphery of the metal thin film 50.

On the other hand, FIGS. 4a to 4c are sectional views showing the seven-core nuclear power plant cables according to the second embodiment of the present invention, wherein each cable has monitoring means. In FIGS. 4a to 4c, the conductors 10, the insulation layers 20 and the sheath 30 of a nuclear power plant cable 200 have been explained above, and accordingly, they will be not explained anymore for the brevity of the description.

In the preferred embodiment of the present invention, the optical cables 70 are four, but they are not limited thereto. For example, the number of optical cables 70 may be two or six.

In this case, the optical cables 70 are located symmetrically inside the sheath 30.

The optical cables 70 of FIG. 4a have the metal thin film 50 as the radiation prevention portion, the optical cables 72 of FIG. 4b have the polymer layer 60 made of the polymer material including the aromatic group, as the radiation prevention portion, and the optical cables 74 of FIG. 4c have both of the metal thin film 50 and the polymer layer 60 made of the polymer material including the aromatic group as the radiation prevention portion. The metal layer film and the polymer material have been already explained in FIGS. 3a to 3c, and accordingly, they will be not mentioned anymore for the brevity of the description.

Hereinafter, the configuration of the monitoring system for monitoring the state of the nuclear power plant cable through the above-mentioned optical cables will be described with reference to the drawing.

FIG. 5 is a schematic view showing a monitoring system for monitoring the nuclear power plant cable according to the present invention.

Referring to FIG. 5, a monitoring system 300 includes the nuclear power plant cable 100 or 200 having at least one or more optical cables 70 and the monitoring device 310 adapted to transmit monitoring light upon the optical cables 70, to receive the reflected monitoring light, and to monitor the nuclear power plant cable 100 or 200. Further, the monitoring system 300 includes a coupler 320 adapted to selectively connect the optical cables 70 and the monitoring device 310 and a distributor 330 adapted to distribute the nuclear power plant cable 100 or 200 in such a manner as to allow the nuclear power plant cable 100 or 200 to be connected to a plurality of equipment. In FIG. 5, a reference numeral 305 indicates a control unit from which control signals are generated through the nuclear power plant cable 100 or 200, and a reference numeral 350 indicates a variety of components of the nuclear power plant to which the nuclear power plant cable 100 or 200 is connected to receive the signals.

In more detail, the monitoring device 310 includes the OTDR 312 adapted to transmit monitoring light upon the optical cables 70 and to receive the reflected monitoring light and an analyzer 314 adapted to analyze the waveforms of the reflected monitoring light.

The OTDR 312 produces the monitoring light having given waveforms and transmits the monitoring light upon the optical cables 70, thereby receiving the quantity of light returned through the reflection and/or scattering on the respective points along the direction of the length of the optical cables 70. Accordingly, the distance distribution of the reflected monitoring light is analyzed by means of the analyzer 314 to recognize the point where heat is raised locally on the optical cables 70, and further, the distance up to the point where heat is raised locally on the optical cables 70 is measured.

In more detail, the OTDR 312 is connected to the optical cables 70 through the coupler 320. For example, the OTDR 312 is connected periodically to each optical cable 70, and alternatively, it is connected to each optical cable 70 if a doubt about the damage of the cable occurs. On the other hand, if the monitoring light incident along one optical cable is scattered or reflected and received, the distances of the peaks according to the lengths of the distributed optical cables are provided to the OTDR 312. Accordingly, the distances of the peaks according to the respective optical cables provided from the OTDR 312 are checked by an operator, thereby recognizing the optical cable corresponding to the peaks.

On the other hand, the plurality of equipment 350 has reflection means, for example, reflection filters 340 disposed on the inputs thereof so as to reflect the monitoring light thereon. The reflection filters 340 are disposed on an optical connector assembly (not shown) for connecting the optical cables and the plurality of equipment 350. If the reflection filters 340 are provided, the peak signals reflected from the ends of the optical cables 70, that is, from the inputs of the plurality of equipment 350 become amplified, thereby allowing the peak detection through the OTDR 312 to be easily conducted.

Figure 6:
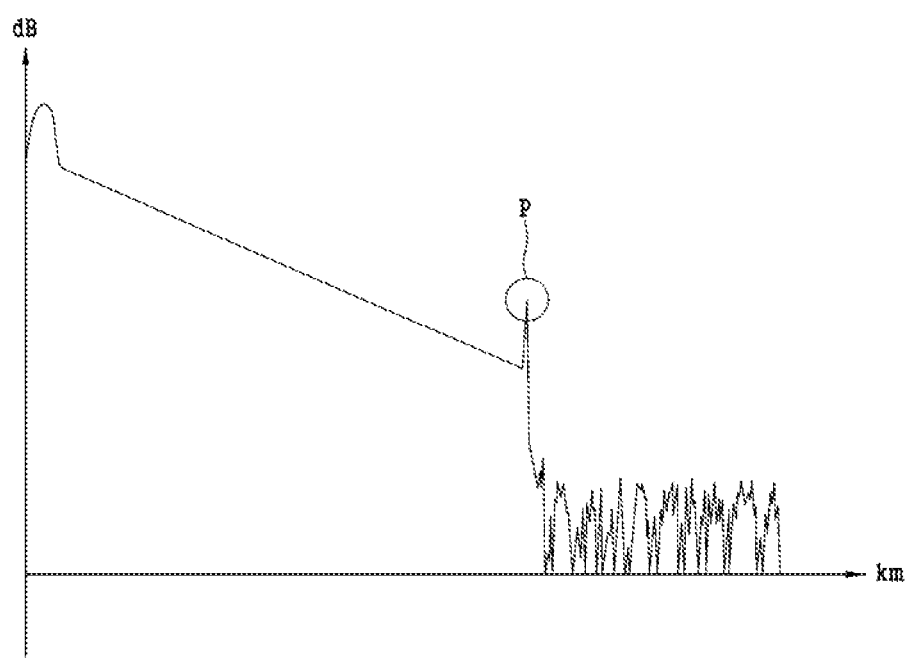
FIG. 6 is a graph showing OTDR standard waveforms in the monitoring system in FIG. 5.

FIG. 6 is a graph showing OTDR standard waveforms in the monitoring system in FIG. 5. In this graph, a horizontal axis indicates distance km, and a vertical axis light intensity dB.

Referring to FIG. 6, the intensity of monitoring light becomes reduced to a given inclination due to the loss of the monitoring light as the length of the optical cable is extended. Moreover, if the monitoring light is reflected by means of the reflection filters 340 provided on the inputs of the nuclear power plant equipment, a given peak P is generated.

If the peak having a given reference value or more is generated, the monitoring device 310 recognizes the peak as the peak (hereinafter, which is referred to as 'reflection peak') reflected by means of the reflection filters 340 provided on the inputs of the nuclear power plant equipment. As a result, the monitoring device 310 analyzes the reflection peak generated from the optical cable and determines whether heat is raised locally on the nuclear power plant cable. Further, the monitoring device 310 measures the distance with a period of time from the transmission of the monitoring light onto the optical cable to the reflection of the monitoring light on the reflection filters and the reception of the monitoring light after the reflection. That is, the monitoring device 310 compares the distance up to the point where the reflection peak P is generated with previously stored lengths of optical cables and recognizes whether the optical cable corresponds to the compared distance, thereby finding the optical cable contained in the nuclear power plant cable on which heat is raised locally.

Figure 7:
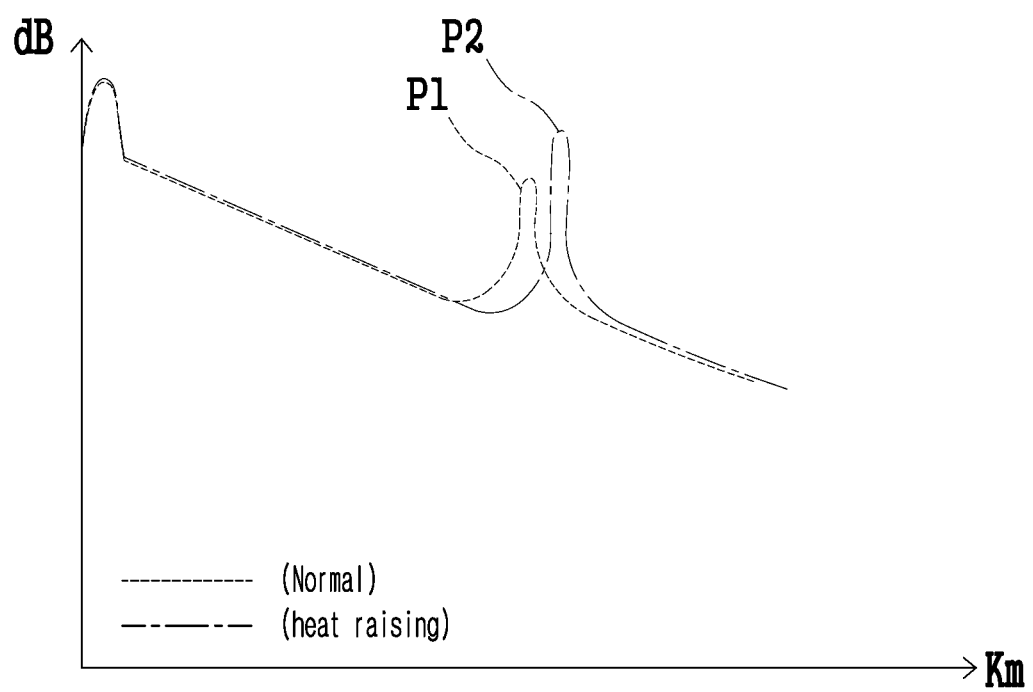
FIG. 7 is a graph showing the comparison between the standard waveforms and measured waveforms in the monitoring system in FIG. 5.

FIG. 7 is a graph showing the comparison between the waveforms of the monitoring light of the optical cable contained in the nuclear power plant cable in a normal state and the waveforms of the monitoring light on the optical cable contained in the nuclear power plant cable on which heat is raised locally.

Referring to FIG. 7, in case of the normal state where no heat is raised locally on the nuclear power plant cable, the waveforms of the monitoring light of the OTDR 312 contain a reflection peak P1. On the other hand, the reflection peak P1 in the normal state corresponds in height and position to the peak of the waveforms of the monitoring light measured after the nuclear power plant cable is initially installed.

Just after the initial installation of the nuclear power plant cable 100 or 200 having the optical cables 70, 72 or 74, that is, the analyzer 314 of the monitoring system 300 records the waveforms of the monitoring light through the ODTR 312 and stores the recorded waveforms as standard waveforms. Since the state just after the initial installation of the nuclear power plant cable 100 or 200 means the normal state where no damage occurs on the nuclear power plant cable 100 or 200, the waveforms of the monitoring light in such normal state are stored as the standard waveforms through the analyzer 314, and after that, the measured waveforms are compared with the standard waveforms, thereby determining whether the nuclear power plant cable becomes in an abnormal state.

On the other hand, if heat is generated locally on a given portion of the nuclear power plant cable 100 or 200, a reflection peak P2 of the optical cable 70 contained in the nuclear power plant cable 100 or 200 is different in height and position from the reflection peak P1 in normal state. Accordingly, the measured waveforms through the OTDR 312 are compared with the standard waveforms by means of the analyzer 314, and if at least one of the height and position of the reflection peak is varied, it is found that heat is generated locally on the nuclear power plant cable 100 or 200 to which the optical cable 70 is contained. Accordingly, the nuclear power plant cable 100 or 200 on which heat is generated locally can be previously repaired and exchanged by means of an operator, thereby preventing the damage of the nuclear power plant cable.

As mentioned above, on the other hand, the nuclear power plant cable according to the present invention is used for the nuclear power plant, and in this case, it is very important to reduce the exposure to the radiation. The sheath 30 of the nuclear power plant cable 100 or 200 is made of a radiation resistance material, and thus, the optical cables 70, 72 and 74 disposed inside the nuclear power plant cable 100 or 200 have the radiation prevention parts. The inventor has had tests for checking the radiation shielding effects and the aging prevention effects when the radiation prevention parts are provided to the optical cables 70.

Figure 8:
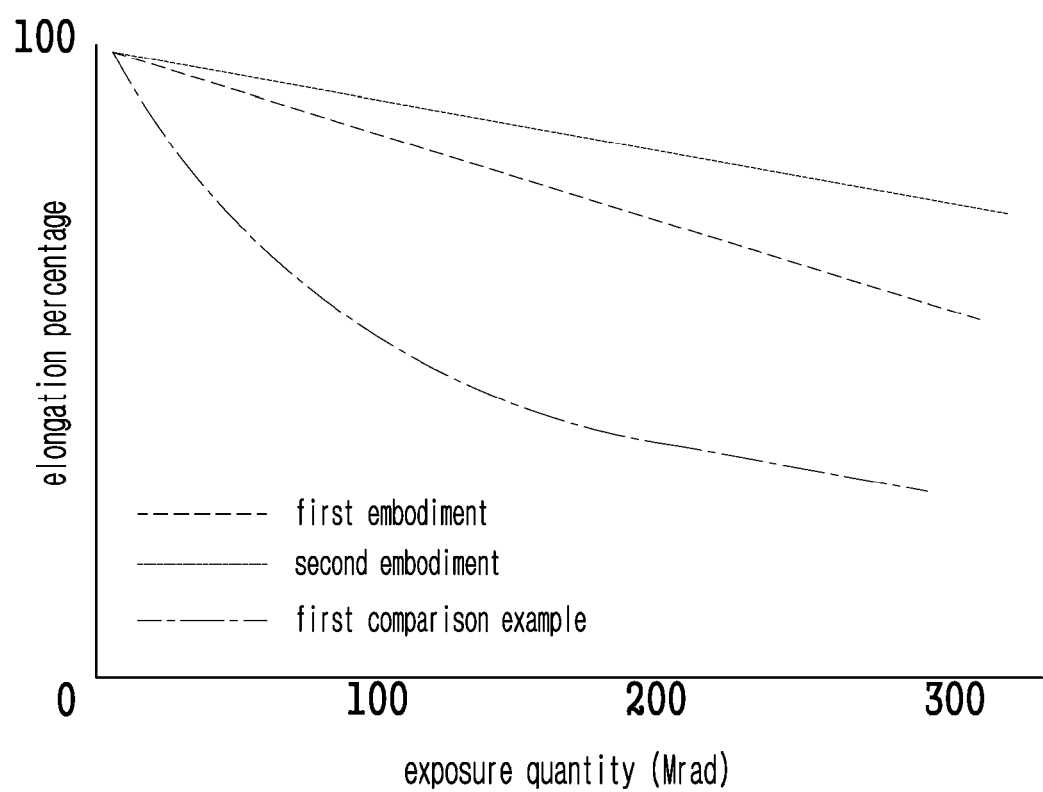
FIGS. 8 to 11 are graphs showing the measurements of the exposure quantity of the cable and the duration in use.
Figure 9:
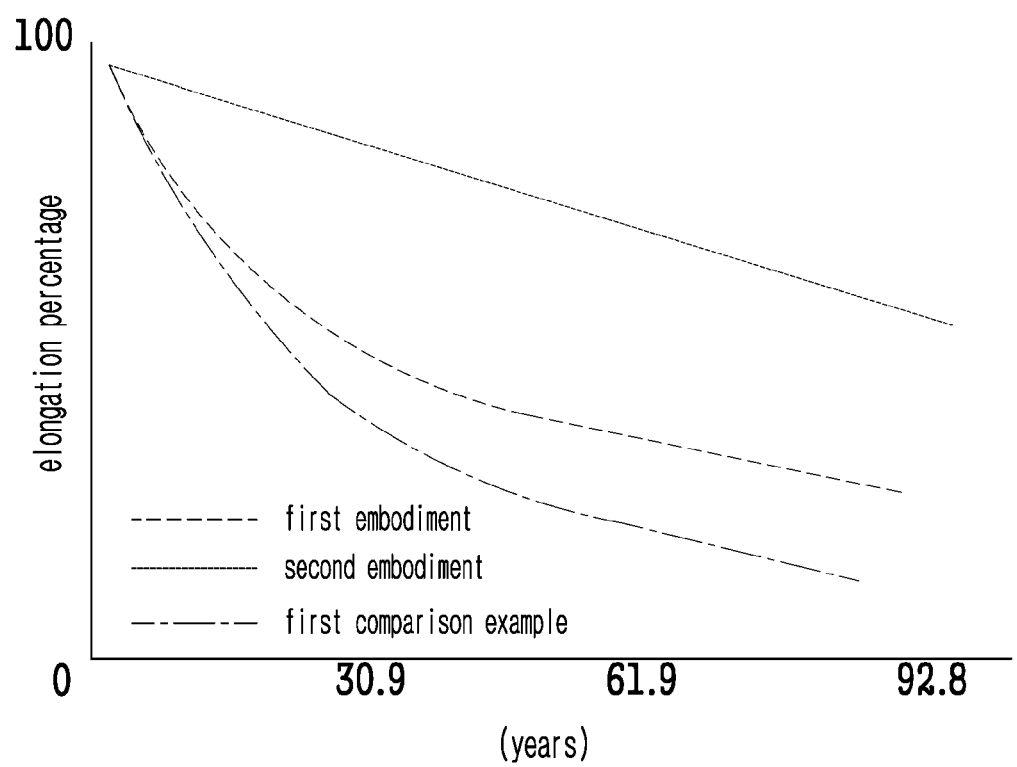

FIGS. 8 and 9 are graphs showing the comparison of the radiation shielding effects and the aging prevention effects between the optical cable having the radiation prevention portion and the optical cable having no radiation prevention portion in the above-mentioned two-core control cable. Hereinafter, a first embodiment of the present invention means the optical cable has the metal thin film as the radiation prevention portion in the two-core control cable, a second embodiment of the present invention means the optical cable has both of the metal thin film and the polymer layer as the radiation prevention portion in the two-core control cable, and a first comparison example means the optical cable having no radiation prevention portion in the two-core control cable.

FIG. 8 shows the elongation percentage with respect to the radiation exposure quantity Mrad in the first and second embodiments of the present invention and the first comparison example. In FIG. 8, the horizontal axis indicates the radiation exposure quantity, and the vertical axis the elongation percentage. Generally, the elongation percentage has a relation with the life span of the cable, and if the elongation percentage is lowered to about 50% or below, the cable should be exchanged with new one.

As shown in FIG. 8, in case of the first comparison example, the radiation exposure quantity is increased, so that the elongation percentage is drastically decreased. Thus, if the radiation exposure quantity reaches about 120 Mrad, the elongation percentage is lowered to 50% or below, the optical cable should be exchanged with new one. To the contrary, in case of the optical cables in the first and second embodiments of the present invention, even though the radiation exposure quantity exceeds 300 Mrad, the elongation percentage is not lowered to 50% or below, so that there is no need for the exchange of the optical cable. Especially, in case of the second embodiment of the present invention wherein both of the metal thin film and the polymer layer are provided as the radiation prevention portion, even though the radiation exposure quantity is increased, the rate of the decrement of the elongation percentage is substantially low, thereby exhibiting remarkably high radiation prevention effects.

On the other hand, FIG. 9 shows the comparison results in the thermal aging degrees in the first and second embodiments of the present invention and the first comparison example. In FIG. 9, the horizontal axis indicates the years of the optical cable, and the vertical axis the elongation percentage. Generally, the longer the years are, the higher the thermal aging degree is, so that the elongation percentage becomes lowered. That is, as the years are increased along the horizontal axis in the graph as shown in FIG. 9, the thermal aging degree becomes high on the cable, thereby reducing the elongation percentage.

Referring to FIG. 9, in case of the first comparison example, the years are increased to cause the elongation percentage to be drastically decreased, and if the years exceed about 30 years, the elongation percentage is lowered to 50% or below, the optical cable should be exchanged with new one. To the contrary, in case of the second embodiment of the present invention, even though the years exceed 90 years, the elongation percentage is not lowered to 50% or below, so that it is appreciated that the life span becomes substantially extended. On the other hand, in case of the first embodiment of the present invention, when the years exceed 60 years, the elongation percentage is lowered to 50% or below. As a result, it is understood that the optical cable in the first embodiment of the present invention has relatively shorter years than those in the second embodiment of the present invention, but has the life span more extended by two times when compared with the first comparison example.

On the other hand, it is hard to really measure the duration of use in a unit of years in the test as shown in FIG. 9, and the optical cable is heated at a given temperature for a given period of time to check the thermal aging degrees of the optical cable, which is converted into real duration of use of the optical cable.

Figure 10:
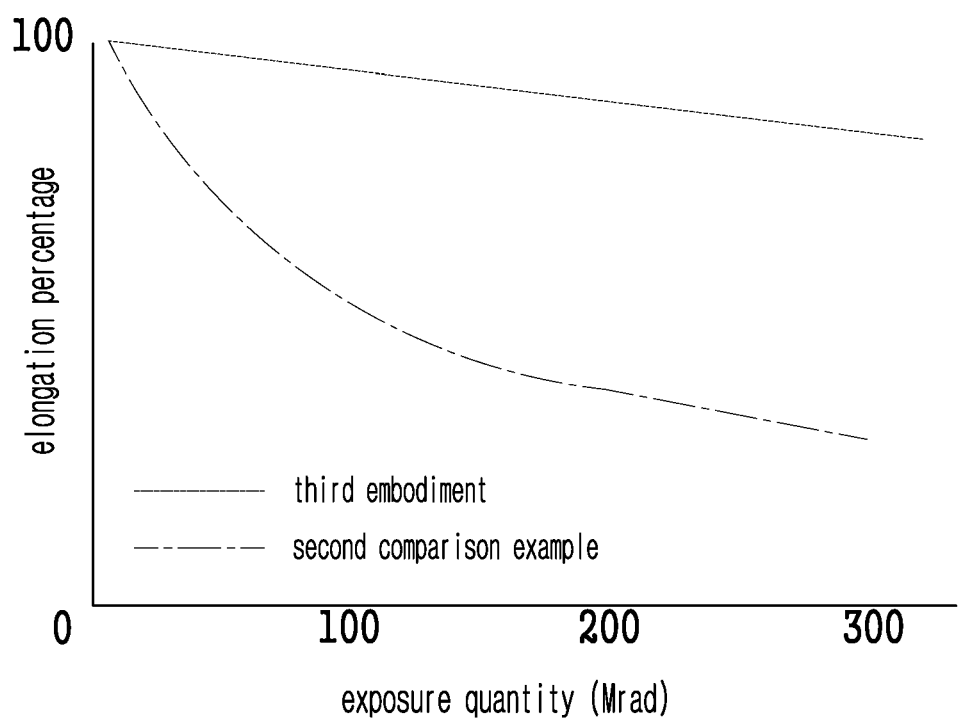
Figure 11:
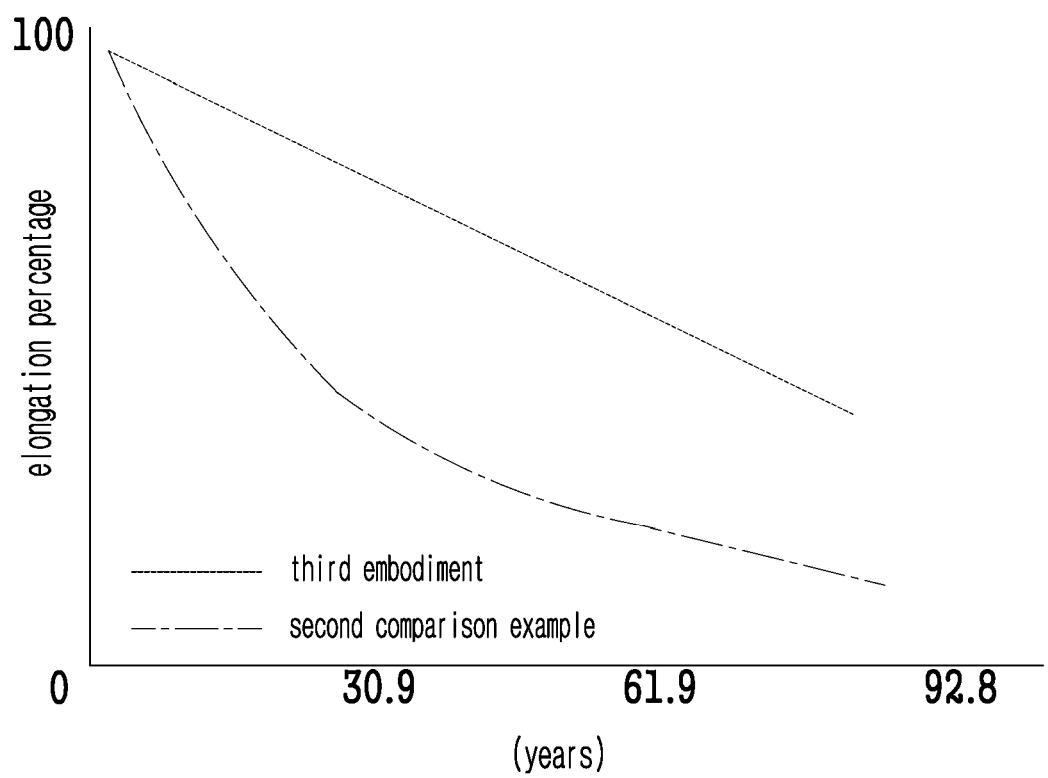

FIGS. 10 and 11 are graphs showing the comparison of the radiation shielding effects and the aging prevention effects between the optical cable having the radiation prevention portion and the optical cable having no radiation prevention portion in the above-mentioned seven-core control cable. Hereinafter, a third embodiment of the present invention means the optical cable has both of the metal thin film and the polymer layer as the radiation prevention portion in the seven-core control cable, and a second comparison example means the optical cable having no radiation prevention portion in the seven-core control cable.

FIG. 10 shows the elongation percentage with respect to the radiation exposure quantity Mrad in the third embodiment of the present invention and the second comparison example.

As shown in FIG. 10, in case of the second comparison example, the radiation exposure quantity is increased, so that the elongation percentage is drastically decreased. Thus, if the radiation exposure quantity reaches about 120 Mrad, the elongation percentage is lowered to 50% or below, and accordingly, the optical cable should be exchanged with new one. To the contrary, in case of the optical cable in the third embodiment of the present invention, even though the radiation exposure quantity exceeds 300 Mrad, the elongation percentage is not lowered to 50% or below, so that there is no need for the exchange of the optical cable, thereby exhibiting remarkably high radiation prevention effects.

On the other hand, FIG. 11 shows the comparison results in the thermal aging degrees in the third embodiment of the present invention and the second comparison example.

Referring to FIG. 11, in case of the second comparison example, the years are increased to cause the elongation percentage to be drastically decreased, and if the years exceed about 25 years, the elongation percentage is lowered to 50% or below, the optical cable should be exchanged with new one. To the contrary, in case of the third embodiment of the present invention, when the years exceed 90 years or more, the elongation percentage is lowered to 50% or below. As a result, it is understood that the optical cable in the third embodiment of the present invention has the life span more extended by three times when compared with the first comparison example.

As described above, the nuclear power plant cable and the nuclear power plant cable monitoring system according to the present invention can monitor and measure the damage and life span of the cable, without any removal of the cable installed in the nuclear power plant. Monitoring can be conducted in real time, especially, without having any stop for the nuclear power plant operated for a substantially long period of time. Accordingly, the present invention prevents the generation of substantially high costs needed for the removal of the cable and the stop of the operation of the nuclear reactors.

Furthermore, the nuclear power plant cable and the nuclear power plant cable monitoring system according to the present invention can perform real time monitoring for the cables installed in all regions of the nuclear power plant, not in a partial region thereof. Accordingly, the states of the cables installed in the whole region of the nuclear power plant can be monitored in real time, and if damage on the cables occurs, an immediate repairing or exchanging operation is performed. Also, the life spans of the cables can be previously expected, and before damage occurs, appropriate treatments are applied.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A nuclear power plant cable comprising:
   conductors;
   at least one or more insulation layers surrounding the conductors;
   a sheath surrounding the insulation layers; and
   monitoring means configured to monitor the states of the insulation layers or the state of the sheath in real time, wherein the monitoring means comprises at least one or more optical cables which sense temperature rise of the insulation layers or the sheath to find a point where a temperature is locally risen on the nuclear power plant cable, wherein each optical cable comprises optical fibers and radiation prevention parts surrounding the optical fibers, wherein the radiation prevention parts comprise a polymer fiber film made of a polymer material coated or taped on the optical fibers to surround the optical fibers and including an aromatic group, and the radiation prevention parts further comprise a metal thin film surrounding the optical fibers and having a value of Half Value Layer (HVL) less than 21.6 mm.

2. The nuclear power plant cable according to claim 1, wherein the optical cables are located symmetrically inside the nuclear power plant cable.

3. The nuclear power plant cable according to claim 1, wherein the optical cables are disposed adjacent to the conductors.

4. The nuclear power plant cable of claim 1, wherein the polymer fiber film is located on an outer periphery of the metal thin film.

5. A nuclear power plant cable monitoring system, comprising:

a nuclear power plant cable having at least one or more optical cables which sense temperature rise of insulating layers or a sheath of the nuclear power plant cable; and a monitoring device to transmit monitoring light upon the optical cables, to receive the reflected monitoring light, and to monitor the nuclear power plant cable such that the monitoring device recognizes a point where a temperature is locally risen on the nuclear power plant cable, wherein each optical cable comprises optical fibers and radiation prevention parts surrounding the optical fibers, wherein the radiation prevention parts comprise a polymer fiber film made of a polymer material coated or taped on the optical fibers to surround the optical fibers and including an aromatic group, and the radiation prevention parts further comprise a metal thin film surrounding the optical fibers and having a value of Half Value Layer (HVL) less than 21.6 mm.

6. The nuclear power plant cable monitoring system according to claim 5, wherein the monitoring device comprises:

an OTDR adapted to transmit monitoring light upon the optical cables and to receive the reflected monitoring light; and an analyzer adapted to analyze the waveforms of the reflected monitoring light.

7. The nuclear power plant cable monitoring system according to claim 6, wherein the analyzer stores standard waveforms of the monitoring light received through the ODTR and compares the standard waveforms with measured waveforms to determine whether the nuclear power plant cable is damaged.

8. The nuclear power plant cable monitoring system according to claim 7, wherein the analyzer compares a reflection peak of the standard waveforms with a reflection peak of the measured waveforms to determine whether the nuclear power plant cable is damaged.

9. The nuclear power plant cable monitoring system according to claim 8, wherein the analyzer determines that the nuclear power plant is damaged if at least one of the height and position of the reflection peak of the measured waveforms is different from the reflection peak of the standard waveforms.

10. The nuclear power plant cable monitoring system according to claim 5, wherein the optical cables are located symmetrically inside the nuclear power plant cable.

11. The nuclear power plant cable monitoring system according to claim 5, wherein the nuclear power plant cable comprises conductors and at least one or more insulation layers to surround the conductors and the optical cables are disposed adjacent to the conductors.

12. The nuclear power cable monitoring system of claim 5, wherein the polymer fiber film is located on an outer periphery of the metal thin film.

* * * * *